US009652739B2

(12) United States Patent
Siegal et al.

(10) Patent No.: US 9,652,739 B2
(45) Date of Patent: May 16, 2017

(54) USER INTERFACE (UI) CONTROL FOR ATTESTATION PROCESS

(75) Inventors: Bess L. M. Siegal, Potomac, MD (US); Rudy Duym, Nice (FR)

(73) Assignee: Apple Inc., Cupertino, CA (US)

( * ) Notice: Subject to any disclaimer, the term of this patent is extended or adjusted under 35 U.S.C. 154(b) by 1147 days.

(21) Appl. No.: 13/550,126

(22) Filed: Jul. 16, 2012

(65) Prior Publication Data

US 2012/0317494 A1 Dec. 13, 2012

Related U.S. Application Data

(63) Continuation of application No. 12/287,175, filed on Oct. 7, 2008, now Pat. No. 8,225,213.

(51) Int. Cl.
*G06F 3/0481* (2013.01)
*G06Q 10/10* (2012.01)
*G06F 9/44* (2006.01)

(52) U.S. Cl.
CPC ........... *G06Q 10/10* (2013.01); *G06F 3/0481* (2013.01); *G06F 9/4443* (2013.01); *G06Q 10/107* (2013.01)

(58) Field of Classification Search
CPC ..... G06F 3/0481; G06F 9/4443; G06Q 10/10; G06Q 10/107; G06Q 30/02
See application file for complete search history.

(56) References Cited

U.S. PATENT DOCUMENTS

| | | |
|---|---|---|
| 6,119,122 A | 9/2000 | Bunnell |
| 2002/0194083 A1 | 12/2002 | Balabhadrapatruni et al. |
| 2003/0014274 A1 | 1/2003 | Chalon |
| 2004/0181749 A1 | 9/2004 | Chellapilla et al. |
| 2005/0108030 A1 | 5/2005 | Kim |
| 2005/0149375 A1 | 7/2005 | Wefers |
| 2005/0193093 A1 | 9/2005 | Mathew |
| 2005/0198563 A1 | 9/2005 | Kristjansson |
| 2005/0223007 A1 | 10/2005 | Zimmer et al. |
| 2005/0257045 A1 | 11/2005 | Bushman et al. |
| 2006/0184511 A1 | 8/2006 | Koo et al. |

(Continued)

OTHER PUBLICATIONS

Oracle White Paper, "Attestation of Identity Information", May 2006.*

(Continued)

*Primary Examiner* — Tuyetlien T Tran
(74) *Attorney, Agent, or Firm* — Blakely, Sokoloff, Taylor & Zafman LLP

(57) ABSTRACT

Methods and apparatus involve attestation of items, such as user profiles, roles, assets, etc. In a computing environment, a compliance administrator initiates an attestation process, including specifying particular attributes of a user that require attestation. A workflow is launched to present the user with a workflow form in a browser page of his computing device. As part of the launch, a UI control makes calls to an attestation service to determine which attributes of the user were specified by the compliance administrator and to query an association between each of the specified attributes and a particular UI control and field value therefor. Upon obtaining the results, the particular UI control for the specified attributes are presented to the user in the workflow form, along with an attestation question UI control, and an option for the user to update at least one of their field values.

12 Claims, 3 Drawing Sheets

(56) References Cited

U.S. PATENT DOCUMENTS

| | | |
|---|---|---|
| 2007/0061872 A1 | 3/2007 | Carter |
| 2007/0118441 A1 | 5/2007 | Chatwani et al. |
| 2007/0179802 A1 | 8/2007 | Buss et al. |
| 2007/0179834 A1 | 8/2007 | Carter et al. |
| 2007/0185856 A1 | 8/2007 | Mittal et al. |
| 2007/0220510 A1 | 9/2007 | Bell et al. |
| 2008/0077530 A1 | 3/2008 | Banas et al. |
| 2008/0209218 A1* | 8/2008 | Rowley ............... H04L 9/3247 713/176 |
| 2008/0301685 A1 | 12/2008 | Thomas et al. |
| 2009/0012834 A1 | 1/2009 | Fahey |
| 2009/0064339 A1 | 3/2009 | Denner et al. |
| 2010/0299320 A1 | 11/2010 | Claud et al. |
| 2011/0145570 A1 | 6/2011 | Gressel et al. |

OTHER PUBLICATIONS

Novell, "Novell Identity Manager"; published on Dec. 8, 2005.

A Joint Solution from Sun and Approva; Sun Microsystems, Inc.; Jul. 2006; sun.com/identify; 2 pages.

Axxiom; Axxiom Business Solutions; 2007; http://axxiominfo.com/products-sodM.asp?src=products; 1 page.

Novell Documentation; (undated); http://www.novell.com/documentation/docui_a/menu.html; 1 page.

Directory Service and Identity Management: Novell eDirectory; 2008; http://www.novell.com/'products/edirectory; 1 page.

Identity Management Security Management Access Management; (undated); http://www.novell.com/identityandsecurity/ . . . ; 3 pages.

Three Sequential Screenshots of Existing Identity Manager Product by Novell, Inc., Including Computing Links Identified by Asterisk (*) for Navigating from One Browser Page to the Next; Sep. 18, 2008; http://localhost:8080/IDMProv/getAFTask.do; 3 pages.

Novell: Search Results, 19.0 Introducing the Compliance Tab; 2008; http://www.novell.com/documentation/idmrbpm361/ugpro/index.html?page=/documentation/idmrbpm361/ugpro/data/be47e2i.html; 11 pages.

* cited by examiner

USER INTERFACE (UI) CONTROL FOR ATTESTATION PROCESS

This application claims priority and benefit as a continuation application of U.S. patent application Ser. No. 12/287,175 filed on Oct. 7, 2008, the entire disclosure of which is incorporated herein by reference.

FIELD OF THE INVENTION

Generally, the present invention relates to computing devices and computing environments involving governance, attestation, compliance, or the like. Particularly, although not exclusively, it relates to a UI control involving attestation of items, such as user profiles, roles, assets, etc. The UI control exists conveniently in a workflow form displayed to a user during the attestation process.

BACKGROUND OF THE INVENTION

Companies have a growing need to adhere to governance and compliance regulations, but often do not have the tools to efficiently and effectively manage user compliance information or user access to restricted information. In some existing products, compliance administrators initiate the attestation process. In order to do so, however, they create specialized workflows (a.k.a. "Provisioning Request Definitions" or "PRDs") which are time-consuming and require specialized skills. Also, PRDs are problematic because many such PRDs are needed per many users in a company, and PRDs often require deployment and testing integration relative to various attestation engine(s).

In still other products, user attestation involves navigating and loading multiple browser pages on a display of their computing device in order to make changes or updates. For example, if users are providing attestation to their profile in a company, e.g, attesting to department, geographic location, phone number, email, manager, etc., it is not uncommon for their profiles to be displayed as read-only values, instead of editable control fields. It is also common to find links to other computing locations where the profiles are actually edited, and such may involve many steps, many loaded pages, etc. Intuitively, such makes for a cumbersome attestation process, and adds time and processing costs.

Accordingly, a need exists in the art of user attestation to avoid the foregoing problems and complexities. The need further extends to achieving editing-in-place functionality while avoiding consequential other problems or complexities. Appreciating users, companies, enterprises, etc. may already own or have access to compliance engines enabling user attestation, the need further extends to retrofitting existing products thereby avoiding the development and purchasing of wholly new products and concomitant processes/techniques. Naturally, any improvements along such lines should further contemplate good engineering practices, such as ease of implementation, unobtrusiveness, security, stability, etc.

SUMMARY OF THE INVENTION

The foregoing and other problems are solved by applying the principles and teachings associated with the hereinafter-described UI control for attestation process. At a high level, users can view and edit attributes needing attesting, or verification, within a single form, which avoids prior art cumbersomeness associated with loading multiple browser pages during the process(es) of attestation, for example.

In various forms, methods and apparatus involve attestation of items, such as user profiles, roles, assets, etc. In a computing environment, a compliance administrator initiates an attestation process, including specifying particular attributes of a user needing attestation. A workflow is launched to present the user with a workflow form in a browser page of his computing device. As part of the launch, a UI control makes calls to an attestation service to determine which attributes of the user were specified by the compliance administrator, including gathering associated metadata, and to query an association between each of the specified attributes and a particular UI control and field value therefor. Upon obtaining the results, the particular UI control for the specified attributes is presented to the user in the workflow form along with an attestation question UI control, including an option for the user to update at least one of their field values. Upon the user selecting the option to update, all the field values for the specified attributes are captured and any directories for the user are modified.

In other features, available storage (i.e., hard disk, server, etc.) houses the specified attributes of the user and their particular UI controls and field values. An Ajax service is provided to interface with the UI control to make its calls and queries. An abstraction layer also exists by which the Ajax service and UI control communicate with the available storage and enter updates.

Appreciating users may already have compliance engines enabling user attestation, such as Novell, Inc.'s, Identity Manager product, the foregoing can be leveraged in this product by placing the UI control on a standard workflow form so it can do the necessary querying for the user's attributes and display them to the user. In other instances, the foregoing is intended to be included as a control on a standard workflow form within the Identity Manager product at the Identity Manager Roles Based Provisioning Module. The invention, however, is not so limited as to be practiced by any particular product and is able to be placed on any HTML page as a standalone control and could potentially provide editing capabilities to any object defined in Novell's Identity Manager's Directory Abstraction Layer (DAL).

In any embodiment, certain advantages are realized. For instance, the foregoing respects trustee rights to put on the metadirectory that allow or restrict the logged in user's ability to see or edit their to-be-verified attributes. It also ensures data integrity by generating a specific UI control for each of the specified attributes. Instead of showing a text field for every possible attribute, for instance, it might show a select box for attributes whose possible values come from a list, radio buttons for boolean values, a "DNLookup" UI control for values that point to other DNs (Distinguished Names) in the metadirectory, an "MVEditor" UI control for multi-valued attributes, etc., based on the attribute as it is defined by Identity Manager's Directory Abstraction Layer (DAL). In turn, this ensures that any updated field values are acceptable and align with the customer's definitions. Furthermore, UI controls are able to handle formatting and localization where necessary, such as for dates and times.

In still other embodiments, the foregoing provides a solution for companies to easily manage a User Profile or other attestation process. Because a web application dynamically generates a user's profile with editable control fields within a single UI control, users can attest to the accuracy of their user profile or other attestation details using a standard workflow form. As a result, compliance administrators do not need to create, deploy, test, customize, etc., workflow provisioning request definitions (aka "PRDs"). Instead, they need only specify which attributes of a user need to be verified. When the attestation task appears in a user's queue, the UI control generates each attribute to be verified, with formatting, validation and restricted values already built in. Not only can the information be verified, but also it can be updated in a user-friendly manner. Avoiding PRDs, which are known to be time-consuming and require specialized skills, also avoids scalability problems as vastly different enterprises with different users, each with their own attributes needing attestation, avoids creating specialized workflow processes per each enterprise. Instead, any enterprise can use an out-of-the-box product with a single UI control that allows them to select attributes through a simple attestation management interface.

Executable instructions loaded on one or more computing devices for undertaking the foregoing are also contemplated as are computer program products available as a download or on a computer readable medium. The computer program products are also available for installation on a network appliance or individual computing devices.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for a UI control for an attestation process, especially attestation in the form of a "user profile" as in the following examples.

Figure 1:
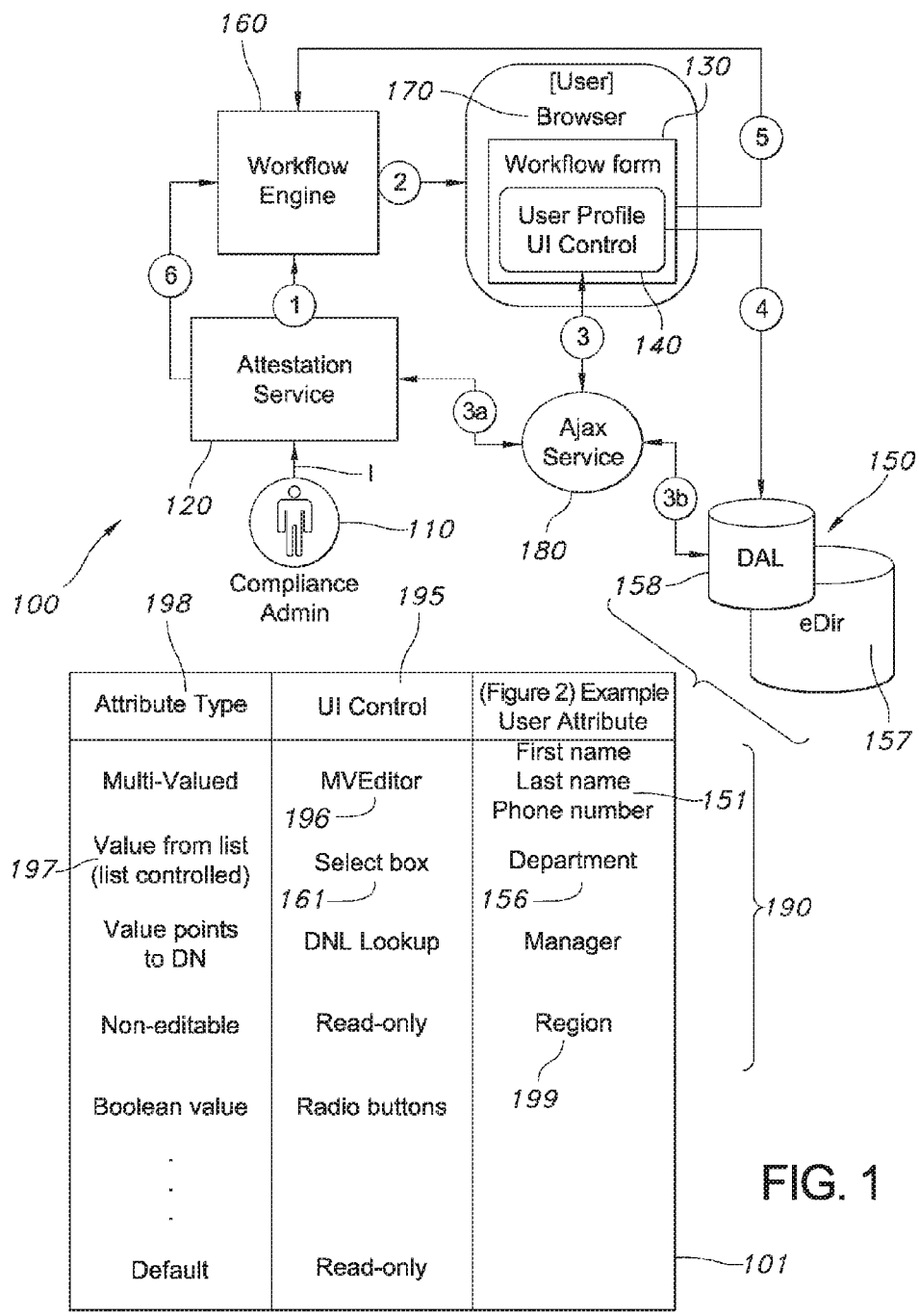
FIG. 1 is a diagrammatic view and flow chart in accordance with the present invention of a representative computing environment for UI control in an attestation process.

With reference to FIG. 1, a computing environment for undertaking attestation is given generally as 100. At a high level, it includes one or more computing devices (described more in relation to other figures), a compliance administrator 110, an attestation service 120, a workflow with form 130 and UI control 140, and available storage 150.

In more detail, the compliance administrator is typically a human(s) engaged/employed by a company or enterprise that attends to administrative tasks regarding the governance, compliance, etc., of the company's regulations, procedures, rules, etc. for reasons of internal or external reporting, auditing, tracking, etc., or for other reasons. They are also the entity that regularly involves itself with the details of tasking other parties or employees of the company (generically "users") to provide attestation to items of governance, compliance, etc. Typically, attestation appears in the form of user work profiles, user roles, user or company assets, materials, shipping, or any other item a company, business, etc. may have need to track for compliance reasons, docketing reasons, tracking reasons, etc. During user attestation, the compliance administrator routinely checks when events are due for reports, docketing, etc. and initiates tasks for users to attest to the items. In the age of computers, attestation is now regularly automated and heavily involves computing devices, thereby improving record-keeping, storage, auditing, etc., but in some instances, may still be done manually by way of phone calls, filling out paperwork, or the like. As described herein, however, the focus of attestation will be that exercised in a computing environment. Also, modern times may replace a human compliance administrator with an automated process, machine, computing device, etc., and the claims are not limited to any particular embodiment unless specified.

Figure 2:
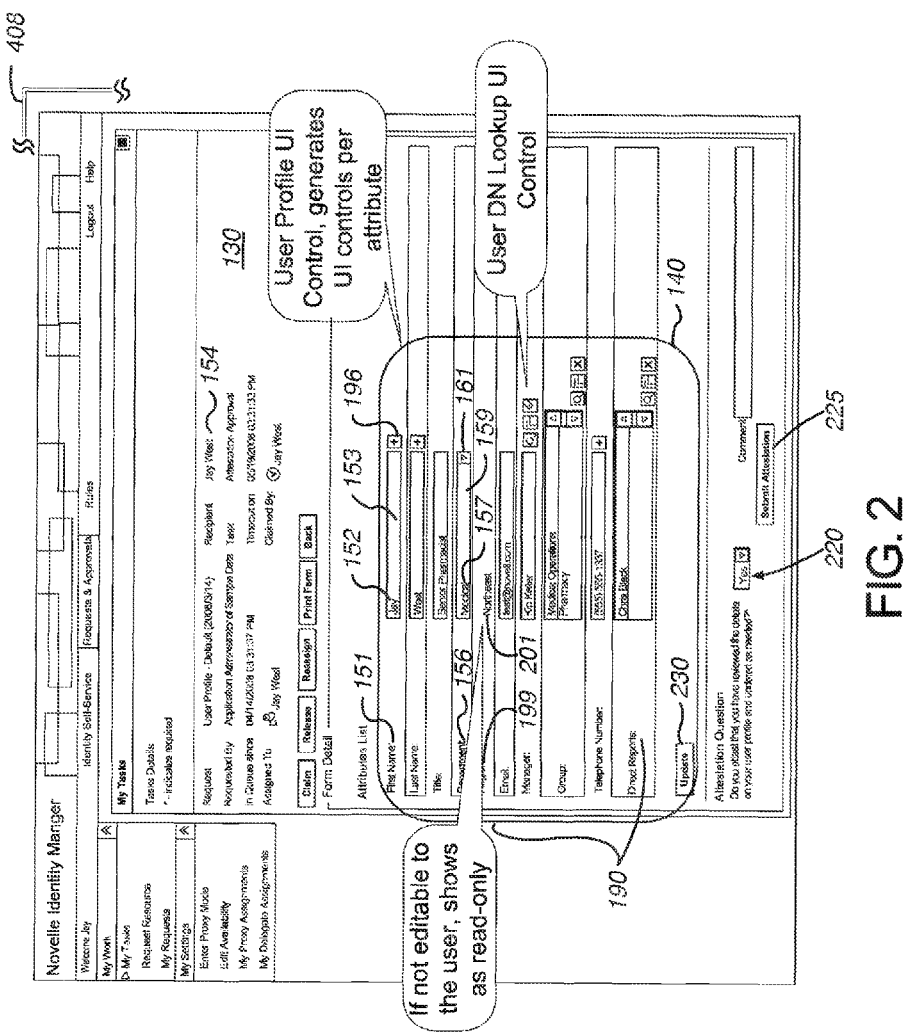
FIG. 2 depicts a screenshot of a browser page loaded on a display of a computing device, including a workflow form and UI control.

With reference to both FIGS. 1 and 2, the compliance administrator 110 initiates (I) an attestation process by making a request of the attestation service 120 for, in this example, a user profile attestation. As part of this request, the compliance administrator specifies to the attestation service which attributes of the user need or require verification. For instance, in the context of attestation regarding a user's profile, attributes of the user would likely consist of the user's name, address, job title, job department, manager(s), contact information (e.g., email and phone numbers for home, work, and mobile), etc. However, in the context of attestation regarding an asset of the company, such a user's laptop, attributes would likely consist of the user's name, title, department, or other such identifying information, but would also likely include the make, model, serial number, etc of the laptop to be identified. Similarly, an attestation of user role would likely consist of attributes identifying the user, as before, but would further likely include a description of their job title, a corporate line item, educational requirements for the role, etc. Of course, a near infinite possibility exists regarding the types of attestation that may be required in the process, as well as the many possible attributes thereof. Thus, the following example is only illustrative.

Also, the available storage 150, is one such location for repositing the attributes of a user requiring attestation, as well as the values therefor. Namely, an attribute of "first name" 151 will have a particular value of "Jay" 152 (FIG. 2 in field 153) for a user having the name Jay West 154. On the other hand, an employee having the name John Doe, will also have a "first name" attribute, but its corresponding value will be "John," and so on for other attributes and their values, for all the users. Of course, storage can be any of a variety of local or remote (or both) storage, and skilled artisans understand it to include computing structures such as hard drives, servers, tape disks, computer readable media (e.g., CD's, floppy disks, etc.) or the like. The storage may also be arranged in a variety of ways, including directories (eDirectory 157), and/or include various interface intermediaries facilitating the retrieval or updating of stored information, such as an abstraction layer (e.g., DAL 158).

After initiation of the attestation process, the attestation service launches a workflow, step 1. By way of a suitable workflow engine 160, an attestation task is generated for the user, step 2. By this task, the user verifies their profile (and attributes/values/etc. thereof) and such occurs by way of a display to the user in a workflow form 130 on a browser page 170 loaded on their computing display 408 (also FIG. 3), as is typical. However, what is heretofore unknown, the foregoing further includes a UI Control 140 (a "User Profile" UI Control, in this example), for at least the purposes of dynamically creating on the single workflow form 130 each of the attributes 190, and their corresponding field values, and a particular type of UI control 195 for each. In this manner, users can view and edit those attributes needing attesting, or verification, and do so within a single form, which avoids, as before, cumbersomeness associated with loading multiple browser pages.

In still more detail, the actual construction of the attributes, field values and particular controls, includes the UI Control 140 issuing calls (Ajax calls, in this instance, by way of an Ajax service 180) first, back to the attestation service 120, step 3a, to find out which attributes of the user were specified by the compliance administrator when starting the attestation process. Second, the UI control 140 also makes queries of the available storage 150 (by way of the DAL 158), step 3b, to associate the specified attributes with their corresponding field values and particular UI controls 195. As seen in the on-going example of Jay West as the user, Jay West's attribute "first name" 151 has a field value 152 of "Jay" and is a type of attribute 198 that is multi-valued. In turn, a multi-value editor (MVEditor) 196 is the particular control corresponding thereto, and such is generated in the workflow form 130 for Jay's attestation as best seen in FIG. 2.

Similarly, the attribute "Department" 156 has a field value of "medical" 157 in field 159, and its particular UI control is a select box, 162. At a higher level, select boxes are representative of those items that are list controlled 197. Alternatively still, certain attributes, such as "Region" 199 have their field value indicated as "Northeast" 201, are defined as read-only because the user, Jay West, does not have editing rights for this attribute. On the other hand, if Jay's manager has rights to edit the attribute "Region," and she would be the one tasked to undertake the attestation process, the attribute 199 would show as an editable attribute for her. Of course, these are only examples and any type of UI control can be associated with any attribute, or field value, etc., for any user, and the examples are merely illustrative, not limiting.

Notwithstanding the clarification, certain other attributes, UI controls, etc., include: radio buttons for boolean values, a "DNLookup" UI control for values that point to other DNs (Distinguished Names) in the metadirectory, or a Default entry, as seen in directory 101. In any embodiment, generating a specific UI Control for each of the specified attributes ensures data integrity, as opposed to generating un-editable fields as in the prior art or commonplace controls such as a text field for every possible attribute. Furthermore, UI controls in certain embodiments of this invention handle formatting and localization where necessary, such as for dates and times.

As best seen in FIG. 2, which is a screenshot of an actual prototype of this invention, the particular UI Controls for each attribute 190 of Jay West 154 are generated in the single workflow form 130, along with an attestation question UI Control 220 and a corresponding Submit Attestation button 225. In this manner, Jay West can respond straightaway to the attestation question, if everything is correct in his UI Control 140, or can update any of his attributes. In the former, the workflow is completed when the user submits the workflow form attesting to the validity of the user's attributes, step 5, FIG. 1. In the latter, Jay West updates his profile by entering new field values (such as by typing, or selecting a drop-down item, etc.) in the fields provided, e.g., 153, 159, etc., and selects the update option 230. Then, all the updated and original field values are captured and the UI Control 140 communicates its capture with the available storage 150, via the DAL 158, to update Jay West's information, step 4, FIG. 1.

In step 6, FIG. 1, if the compliance administrator 110 wants to view any results of the attestation process, the attestation service 120 can query the workflow engine 160 for information. In this regard, auditing rights, logging features, traditional bookkeeping entries, etc., are contemplated and skilled artisans readily understand them.

In computing description, the foregoing UI controls comprise a JavaScript object, in addition to the Ajax service, to communicate with the server and is rendered with the help of a JavaScript template. During use, when the JavaScript object initiates rendering, the Ajax service determines the list of attributes from the Attestation Service and queries the DAL for the attribute values of the user to be verified, as well as the logged in user's edit rights for each of the attributes specified by the compliance administrator. Then, for each non-editable attribute, each value is resolved and/or formatted to the logged in user's locale. Alternatively, for each editable attribute, the HTML markup for the appropriate UI Control is generated via a call to a UIControlHelper. In turn, the localized attribute display labels, field values, and UI Control markup are returned to the JavaScript object. The JavaScript object then runs an HTML template, which iterates through the attributes and writes out the display labels, field values and/or UI Control HTML markups. The Update button is also generated. Finally, the JavaScript object calls a JUICE renderer to render the UI Controls. In situations when the Update button is activated, or clicked, the JavaScript object collects all the values in each UI Control, and sends them back to the Ajax service to update the directory through the DAL.

Figure 3:
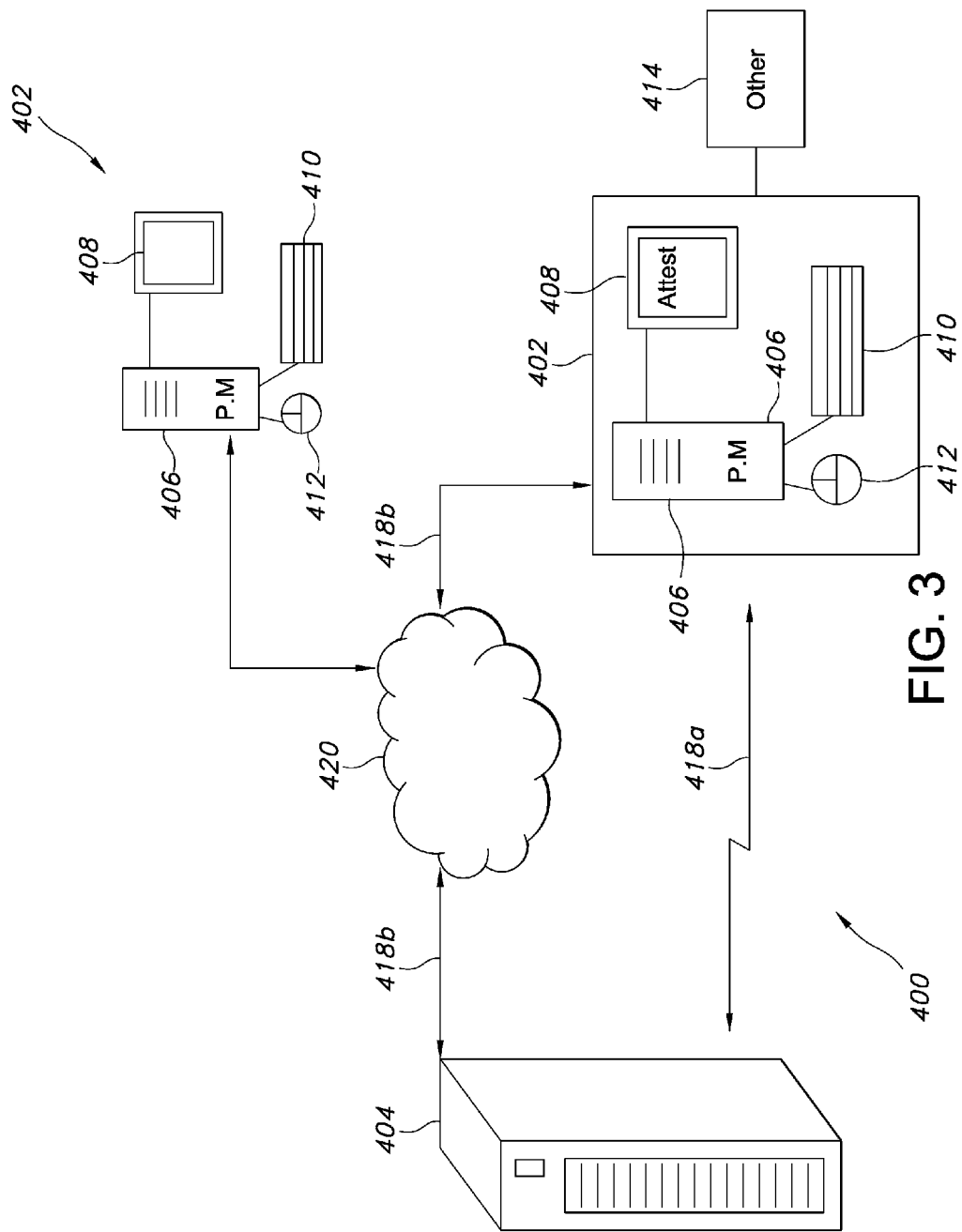
FIG. 3 is a diagrammatic view in accordance with the present invention of a representative computing environment, including computing devices for use in a UI control for an attestation process.

In any embodiment, skilled artisans will appreciate that implementation touches upon computing system environments, computing devices, computer program products, or the like. With reference to FIG. 3, a representative computing environment 400 for UI control for an attestation process includes computing devices 402 for the user and compliance administrator arranged as individual or networked physical or virtual machines, including or not a back end host 404 and/or other clients arranged with a variety of other networks and computing devices. In a traditional sense, an exemplary host 404 typifies a server, such as a grid or blade server. Brand examples include, but are not limited to, a Windows brand Server, a SUSE Linux Enterprise Server, a Red Hat Advanced Server, a Solaris server or an AIX server. A computing device 402, on the other hand, may also include a server 406 or be arranged as a general or special purpose computer in the form of a conventional fixed or mobile (e.g., laptop) computer having an attendant monitor 408 and user interface, such as a keyboard 410 and a pointing device 412. The computer internally includes a processing unit for a resident operating system, such as DOS, WINDOWS, MACINTOSH, LEOPARD, VISTA, UNIX, and LINUX, to name a few, a processor (P), memory (M), and a bus that couples various internal and external units, e.g., "Other" 414, to one another. Representative "other" items 414 include without limitation PDA's, cameras, scanners, printers, microphones, joy sticks, game pads, satellite dishes, hand-held devices, consumer electronics, minicomputers, computer clusters, main frame computers, a message queue, a peer computing device, a broadcast antenna, a web server, an Ajax client, a grid-computing node, a virtual machine, a web service endpoint, a cellular phone, and the list goes on. The other items may also be stand alone computing devices in the environment 400 or the computing device 402 itself.

Storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage.

Regardless of form, the foregoing further contemplates computer executable instructions, e.g., software, as part of: computer program products on readable media, e.g., disk for insertion in a drive of computer 406; as a download of executable instructions resident with a downstream computing device or received from an upstream computing device or readable media; as a download of executable instructions resident on an upstream computing device or readable media awaiting transfer to a downstream computing device or readable media; or any available media, such as RAM, ROM, EEPROM, CD-ROM, DVD, or other optical disk storage devices, magnetic disk storage devices, floppy disks, or any other medium which can be used to store the instructions thereof and which can be assessed in the environment.

It will be therefore appreciated that the system 400 shown in FIG. 3 is configured to perform the attestation tasks as set forth above, and that computer software for performing those tasks is contemplated. In particular, using the workflow form 130 shown in FIG. 2, executable instructions are configured, one, to determine an associated UI control for each of the attributes 190 of the user having been specified by the compliance administrator and, two, to generate for a browser page of the computing device the associated UI control 195 along with an attestation question UI control 220. Further still, the executable instructions are configured to generate the option 220 for the user to update at least one field value in the browser page corresponding to one of the attributes thereby avoiding needing multiple browser pages to be loaded during use. Other executable instructions are configured for capturing all the field values for the specified attributes upon the user selecting the option to update, to determine whether the user has editing rights for field values associated with the specified attributes, to generate the associated UI control for the specified attributes as read-only or according to a locale of the user upon the user not having editing rights, or for any other feature.

In network, the host 404 and computing device 402 communicate with one another via wired, wireless or combined connections 418 that are either direct 418a or indirect 418b. If direct, they typify connections within physical or network proximity (e.g., intranet). If indirect, they typify connections such as those found with the internet, satellites, radio transmissions, or the like, and are represented schematically as element 420. In this regard, other contemplated items include servers, routers, peer devices, modems, T# lines, satellites, microwave relays or the like. The connections may also be local area networks (LAN), metro area networks (MAN), and/or wide area networks (WAN) that are presented by way of example and not limitation. The topology is also any of a variety, such as ring, star, bridged, cascaded, meshed, or other known or hereinafter invented arrangement.

In any configuration, certain advantages of the invention over the prior art should now be readily apparent. For example, the present invention sets forth structures and methods for UI controls in an attestation process, which significantly reduce computation and cumbersomeness associated with the prior art, as described. Also, the foregoing: 1) allows a user to view and edit his user profile within a standard workflow form; 2) by leveraging the existing workflow engine of Novell's Identity Manager, allows the retrofit placement of a UI control 140 on a standard workflow form 130 such that all necessary querying for the user's attributes are readily displayed to the user; 3) respects trustee rights when putting metadirectory that allows or restricts the user's ability to see or edit his or her attributes of the profile to be verified; 4) enables different enterprises with different user attestation requirements not to have to create their own workflow processes, which are time-consuming and require specialized skills; 5) ensures data integrity by generating a specific UI Control for each of the specified attributes, instead of showing a text field for every possible attribute or all read-only options; 6) ensures that the updated values of users are acceptable and align with the customer's DAL definitions; and 7) enables placement on any HTML page as a standalone control, not just workflow forms, and could potentially provide editing capabilities to any object (aka "entity") as defined in Novell Identity Manager's Directory Abstraction Layer, to name a few.

Although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. A data processing system to operate with an attestation service stored on a first non-transitory computer readable storage device, the data processing system comprising:
   one or more processors;
   a display device to display a user interface (UI) control provided via a browser configured for execution on the one or more processors; and
   instructions stored on a second non-transitory computer readable storage device to cause the UI control, via the one or more processors, to query the attestation service for a set of attributes specified for attestation, the attestation service having determined a remotely specified set of attributes for attestation, gathered metadata associated with the set of attributes, and determined an association between each attribute and a particular UI control;
   wherein the instructions cause the UI control to dynamically generate, within a single workflow form, a particular UI control for each attribute in the set of attributes specified for attestation, and present the particular UI control for each attribute in the set of attributes within the single workflow form via a browser, at least one particular UI control including an option to update at least one field value of an associated attribute;

wherein the UI control is to determine whether editing rights are present for a field value associated with an attribute and, upon a determination that a user does not have editing rights for the attribute, generate a particular UI control for the attribute according to a locale of the user associated with the attribute; and generate and present, via the browser, an attestation question UI control within the single workflow form to enable an affirmation that the remotely specified attributes have at least been reviewed.

2. The data processing system as in claim 1, wherein the UI control is to generate and present the single workflow form to bypass a load of multiple browser pages during attestation.

3. The data processing system of claim 1, additionally including an Asynchronous JavaScript and XML (Ajax) service to enable communication between the UI control and the attestation service.

4. The data processing system of claim 3, additionally including an abstraction layer for the Ajax service and the UI control to communicate with the non-transitory computer readable storage device.

5. The data processing system of claim 4, wherein the attestation service includes a workflow engine to launch the single workflow form.

6. The data processing system of claim 1, additionally including a directory access layer configured to enable access to an electronic directory, wherein the electronic directory stores data for a plurality of users and includes the set of attributes for attestation and associated particular UI control and field values.

7. A non-transitory machine-readable medium storing instructions which, when executed by one or more processors, cause the one or more processors to perform operations for an attestation process comprising:

querying an attestation service for a set of attributes specified for attestation, the attributes having been specified to the attestation service by a remote computing device;

receiving, in response to querying the attestation service, the set of attributes specified for attestation, the attestation service having queried a storage device regarding the set of attributes for UI controls and field values associated with the set of attributes, having gathered metadata associated with the attributes, and having determined an association between each attribute and a particular UI control;

determining whether editing rights are present for a field value associated with an attribute in the set of attributes specified for attestation;

generating a particular UI control for the attribute according to a locale of a user associated with the attribute upon determining that the user does not have editing rights for the attribute;

dynamically generating a single workflow form including a particular UI control for each attribute in the set of attributes and an attestation UI question control, the attestation question UI control to enable an affirmation that the attributes specified by the remote computing device have at least been reviewed; and presenting the dynamically generated single workflow form via a browser, at least one particular UI control including an option to update at least one field value of an associated attribute.

8. The non-transitory machine-readable medium as in claim 7, the process additionally comprising capturing field values for the specified attributes upon selection of the option to update at least one field value.

9. The non-transitory machine-readable medium as in claim 7, the process additionally comprising generating the at least one particular UI control including the option to update the at least one field value upon determining that editing rights are present for the at least one field value.

10. A method of performing an attestation process, the method comprising:

querying an attestation service for a set of attributes specified for attestation, the attributes having been specified to the attestation service by a remote computing device;

receiving, in response to querying the attestation service, the set of attributes specified for attestation, the attestation service having queried a storage device regarding the set of attributes for UI controls and field values associated with the set of attributes, having gathered metadata associated with the attributes, and having determined an association between each attribute and a particular UI control;

determining whether editing rights are present for a field value associated with an attribute in the set of attributes specified for attestation;

generating a particular UI control for the attribute according to a locale of a user associated with the attribute upon determining that the user does not have editing rights for the attribute;

dynamically generating a single workflow form including a particular UI control for each attribute in the set of attributes and an attestation UI question control, the attestation question UI control to enable an affirmation that the attributes specified by the remote computing device have at least been reviewed; and presenting the dynamically generated single workflow form via a browser, at least one particular UI control including an option to update at least one field value of an associated attribute.

11. The method as in claim 10, additionally comprising capturing field values for the specified attributes upon selection of the option to update at least one field value.

12. The method as in claim 10, additionally comprising the at least one particular UI control including the option to update the at least one field value upon determining that editing rights are present for the at least one field value.

* * * * *